US008558114B2

(12) United States Patent
Lin

(10) Patent No.: US 8,558,114 B2
(45) Date of Patent: Oct. 15, 2013

(54) TRANSMISSION WIRE

(75) Inventor: Christina Lin, Taipei (TW)

(73) Assignee: Sonnenschein Industrial Co., Ltd., Taipei (TW)

( * ) Notice: Subject to any disclaimer, the term of this patent is extended or adjusted under 35 U.S.C. 154(b) by 400 days.

(21) Appl. No.: 12/956,290

(22) Filed: Nov. 30, 2010

(65) Prior Publication Data

US 2011/0070769 A1 Mar. 24, 2011

Related U.S. Application Data

(63) Continuation-in-part of application No. 12/230,356, filed on Aug. 28, 2008, now abandoned.

(30) Foreign Application Priority Data

Aug. 31, 2007 (TW) ................................ 96214573 U
Aug. 31, 2007 (TW) ................................ 96214580 U

(51) Int. Cl.
*H02G 15/02* (2006.01)
*H01B 7/00* (2006.01)

(52) U.S. Cl.
USPC .................................... 174/74 R; 174/113 R

(58) Field of Classification Search
USPC ....................... 174/113 R, 106 R, 74 R, 88 R
See application file for complete search history.

(56) References Cited

U.S. PATENT DOCUMENTS 3,187,081 A * 6/1965 Bollmeier ................... 174/21 R
4,500,747 A * 2/1985 Dubreuil et al. ................ 174/76
7,159,700 B2 * 1/2007 Liao ............................ 191/12.4
2005/0077074 A1 * 4/2005 Tanaka ....................... 174/117 F
2007/0068697 A1 * 3/2007 Orfin et al. ................ 174/113 R

* cited by examiner

*Primary Examiner* — Chau Nguyen
(74) *Attorney, Agent, or Firm* — Rosenberg, Klein & Lee

(57) ABSTRACT

A transmission wire includes an insulated packaging layer, at least one conducting wire, and a bendable shaped wire. The conducting wire is set inside the insulated packaging layer. The bendable shaped wire and the conducting wire are set inside the insulated packaging layer in common. The transmission wire can be arbitrarily bend and fixed on a desired position or shape via setting the bendable shaped wire inside the insulated packaging layer. Hence, the electronic devices such as microphones or webcams can be stably supported to be used at the most appropriate angle or height, so, the practicability is increased.

11 Claims, 9 Drawing Sheets

TRANSMISSION WIRE

CROSS-REFERENCE TO RELATED APPLICATIONS

This application is a continuation-in-part of application Ser. No. 12/230,356, filed on 28 Aug. 2008, and entitled “TRANSIMSSION WIRE”.

BACKGROUND OF THE INVENTION

1. Field of the Invention

The instant disclosure relates to a transmission wire, and more particular to a transmission wire transmitting signals for electronic devices.

2. Description of Related Art

An electrical connector electronically connects between two electronic devices. The electrical connector is equipped with a transmission wire, the length of the transmission wire is appropriate to meet with the distance of the electronic devices so as to transmit signals. Hence, the transmission wire is a necessary component in the 3C industry. The transmission wire can connect with at least two electronic devices to transmit signals or electric power. Hence, the quality of the transmission wire nearly relates to the operation stability and the life-span of the electronic devices.

The transmission wires on the current market are made of ordinary wires, however, along with the rapid development of the electrical connectors and the PC fittings, the types and the functions of the transmission wires are more and more diverse. Furthermore, some electronic devices need to be supported and fixed on some particular appropriate positions to be used (such as webcams or microphones). However, the transmission wires of the prior arts haven’t the supporting and fixing functions. The webcams or the microphones tend to be fixed on some appropriate positions via other fixing manners. Moreover, the transmission wires of the prior arts are messy and easily tangled, so it is troublesome to put the transmission wires in order.

Consequently, because of the technical limitations of described above, the applicant strives via real world experience and academic research to develop the instant disclosure, which can effectively improve the limitations described above.

SUMMARY OF THE INVENTION

The object of the instant disclosure is to provide a transmission wire, which can be arbitrarily bent and shaped in a desired position and with a desired shape.

For achieving the object described above, the instant disclosure provides a plurality of conducting wires, a separating layer surrounding and covering the conducting wires, a mesh grid surrounding the separating layer, a bendable shaped wire disposed adjacent the mesh grid and made of flexible metal material, an insulated packaging layer surrounding and covering the plurality of conducting wires, and two electrical connectors. Each conducting wire has a conducted core and an insulated material layer covered the conducted core, The two electrical connectors are connected with two ends of the conducting wires. Each electrical connector has an insulating retainer partially enclosed ends of the conducting wires. The insulating retainer is formed with a receiving slot therein beside the conducting wires, and one end of the bendable shaped wire is retractably disposed in the receiving slot.

The advantages of the instant disclosure are:

The transmission wire can be arbitrarily bend and shaped in a desired position and with a desired shape via setting the bendable shaped wire inside the insulated packaging layer. Hence, the electronic devices such as microphones or webcams can be stably supported to be used at the most appropriate angle or height, so, the practicability is increased.

Further, because the transmission wire of the instant disclosure can be bent and shaped, it is convenient to put the transmission wire in order, and the situation of the transmission wire is messy or tangled around the PC can be avoided.

The features and technology of the instant disclosure can be further understood by reference to the following detailed description when taken in conjunction with the accompanying drawings, and the accompanying drawings are provided only for reference and illustration and not for limiting the instant disclosure.

DETAILED DESCRIPTION OF PREFERRED EMBODIMENTS

Please refer to FIGS. 1-8 showing a transmission wire of the instant disclosure, the transmission wire includes an insulated packaging layer 11, at least one conducting wire 12, and a bendable shaped wire 13.

Figure 1:
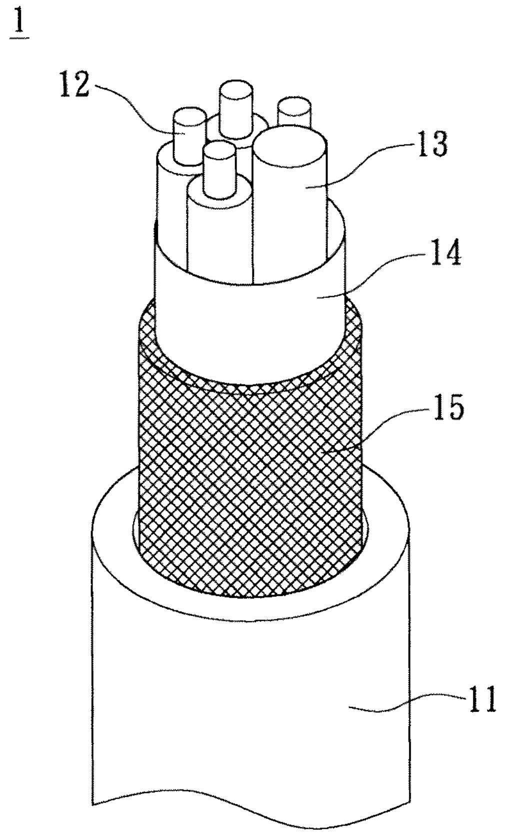
FIG. 1 is a perspective view of a transmission wire according to a first embodiment of the instant disclosure.
Figure 2:
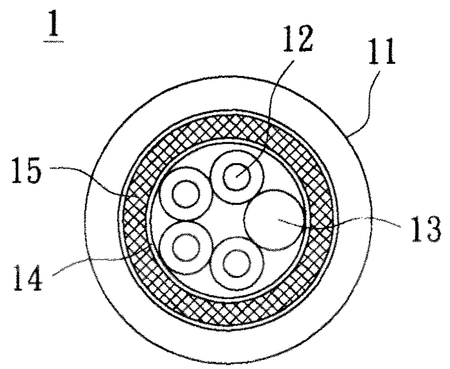
FIG. 2 is a cutaway view of the transmission wire according to the first embodiment of the instant disclosure.

Please refer to FIG. 1 and FIG. 2 showing a first embodiment of the instant disclosure. The insulated packaging layer 11 is made of insulating material and can effectively insulate the electricity transmission from outside interference, and thereby preventing the transmission wire 1 from being shorted or interfered by noises.

In the present embodiment, there is a plurality of the conducting wires 12, and the conducting wires 12 are set inside the insulated packaging layer 11. The external diameter of the insulated packaging layer 11 is 3.0 mm-9.0 mm. The insulated packaging layer is made by an integral forming process of Polyvinylchloride (PVC).

The surfaces of the conducting wires 12 are respectively packaged with the insulated material to avoid shorting during the transmission and avoid damage to the electronic devices. The conducting wires 12 respectively have a conducted core and an insulated material layer covered the conducted core. In this embodiment, the conducting wires 12 are arranged to contact each other.

The bendable shaped wire 13 and the conducting wires 12 are set together inside the insulated packaging layer 11. The bendable shaped wire 13 is a metallic rod, such as iron wire or copper wire. The diameter of the bendable shaped wire 13 is from 0.6 mm to 2.0 mm. The bendable shaped wire 13 and the conducting wires 12 are set in a sheaf.

A separating layer 14 is set between the conducting wires 12 and the insulated packaging layer 11. The bendable shaped wire 13 is set inside the separating layer 14, that is, the separating layer 14 simultaneously packages the conducting wires 12 and the bendable shaped wire 13. The separating layer 14 is made of aluminum foil paper and can effectively insulate electromagnetic waves or other noises when the transmission wire 1 is transmitting signals, and thereby preventing the signals from being interfered by noises and the transmission quality from being degraded or interrupted.

A mesh grid 15 is set outside the separating layer 14. The mesh grid 15 is netlike and weaved by many iron wires which have the same diameter. Similar to the separating layer 14, the mesh grid 15 can effectively insulate electromagnetic waves or other noises.

Figure 3:
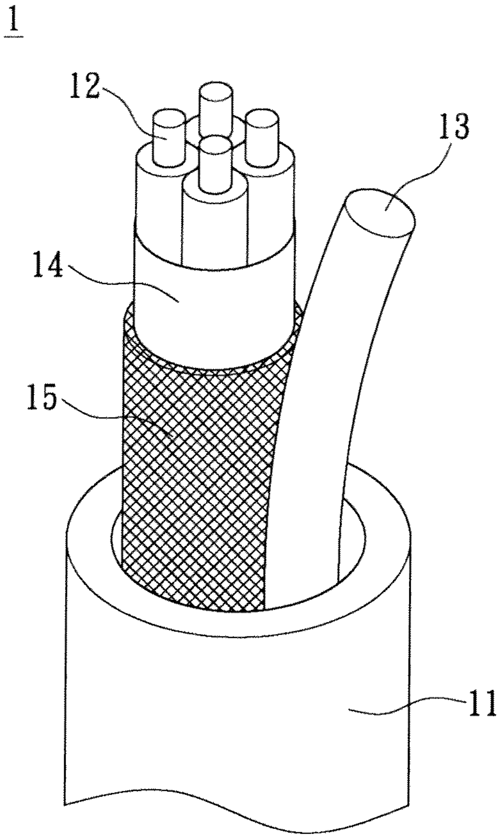
FIG. 3 is a perspective view of a transmission wire according to a second embodiment of the instant disclosure.
Figure 4:
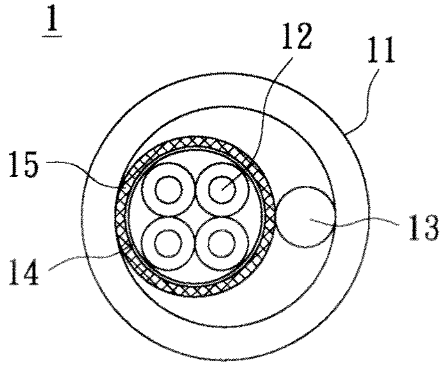
FIG. 4 is a cutaway view of the transmission wire according to the second embodiment of the instant disclosure.

Please refer to FIGS. 3 and FIG. 4 showing a second embodiment of the instant disclosure. The bendable shaped wire 13 is set between the separating layer 14 and the insulated packaging layer 11, the efficacy of which is the same as the first embodiment.

Figure 5:
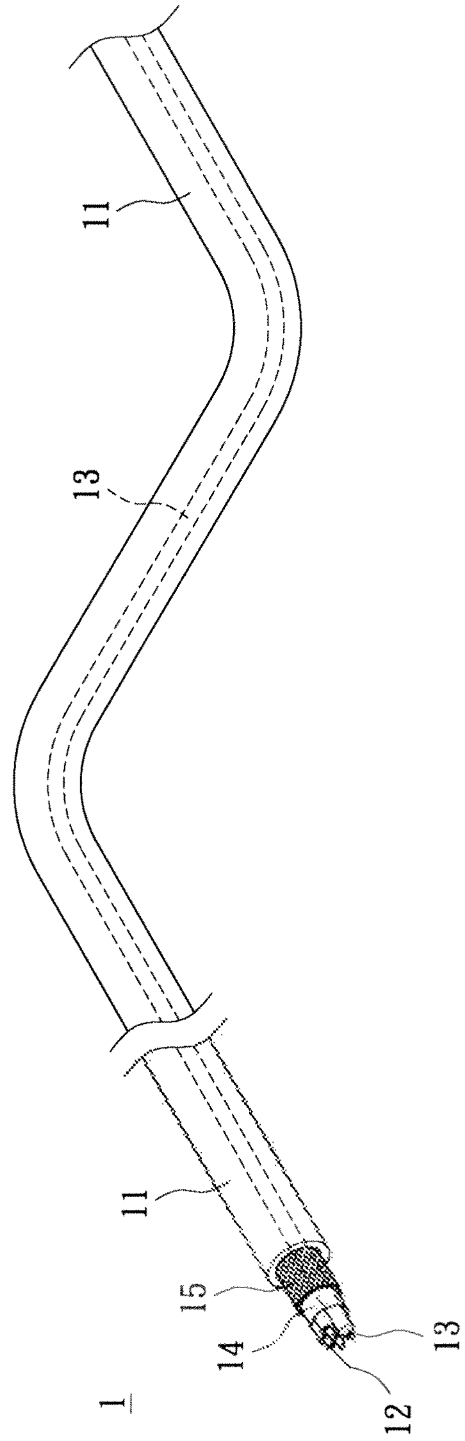
FIG. 5 is a perspective view showing the transmission wire is bent and shaped according to the instant disclosure.

Please refer to FIG. 5, the transmission wire 1 can be arbitrarily bent and fixed on a desired position via setting the bendable shaped wire 13 inside the insulated packaging layer 11, and the transmission of the conducting wires 12 isn't affected.

Figure 6:
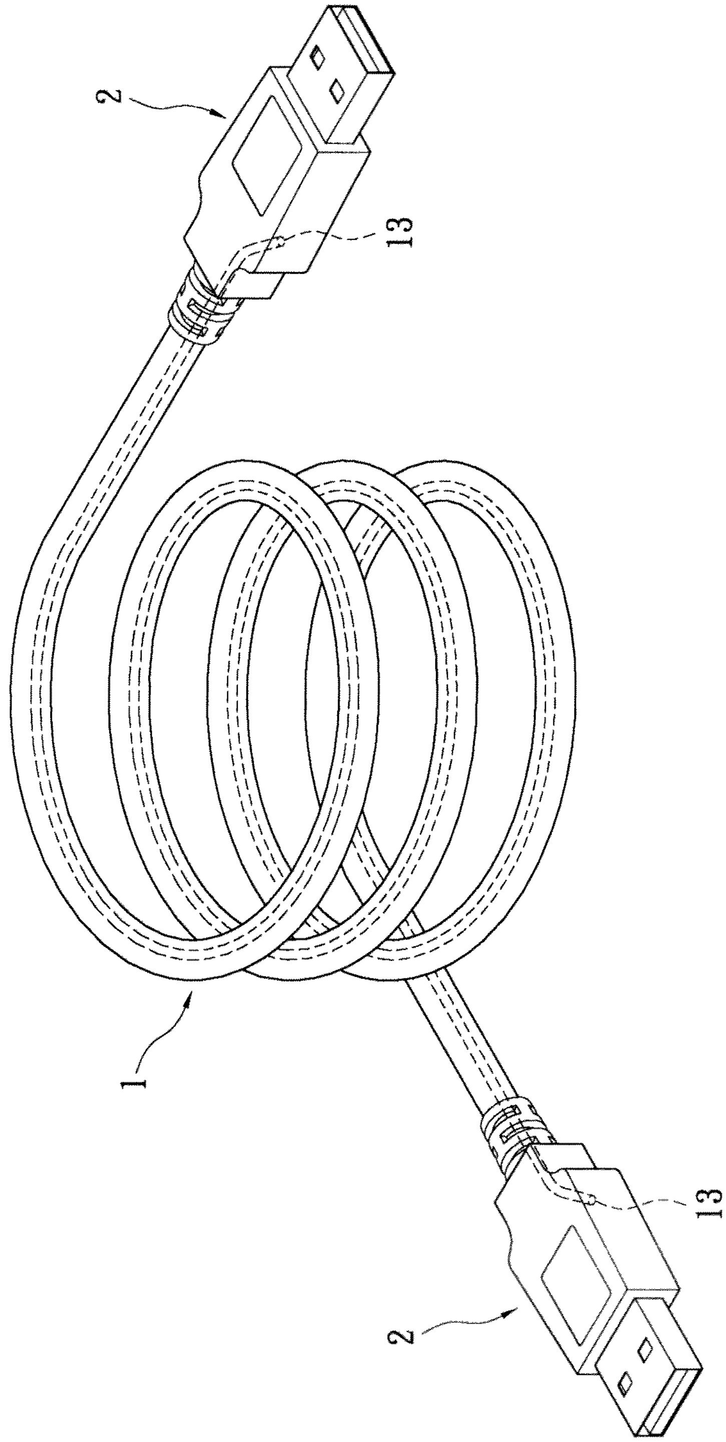
FIG. 6 is a perspective view showing the transmission wire is set with electrical connectors and bent and shaped according to the instant disclosure.

Please refer to FIG. 6, two electrical connectors 2 are respectively set on two ends of the transmission wire 1. In other word, the two electrical connectors 2 are connected with two ends of the conducting wires 12. The electrical connectors 2 can be USB (UNIVERSAL SERIAL BUS), VGA (Video Graphics Array), or other specifications of computer connectors ports which are too numerous too list, etc. When unused, the transmission wire 1 can be stored via coiling. Differ to the common transmission wires, because the transmission wire 1 can be bent and shaped by itself, the transmission wire 1 won't spring, which can be messy; and the transmission wire 1 is convenient for being put in order. As shown in FIG. 6, the bendable shaped wire 13 has two ends, and each end is extended into a part of the electrical connector 2. Each end of the bendable shaped wire 13 is tilted toward an outer side of the electrical connector 2. In other word, the bendable shaped wire 13 is shorter than the conductive wire 12, and the ends thereof are arranged to deviate from the conductive wire 12.

Figure 6B:
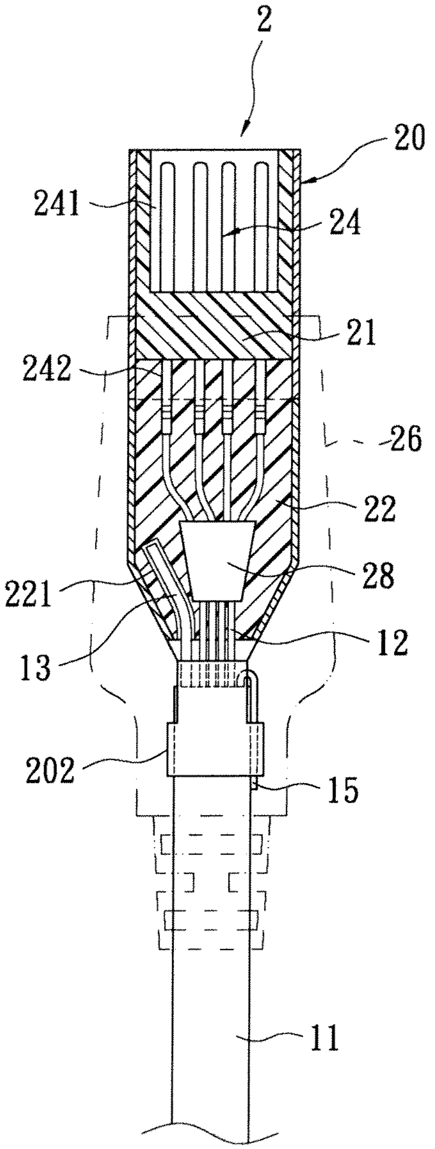
FIG. 6B is a cross-sectional view of the electrical connector of another embodiment according to the instant disclosure.
Figure 6A:
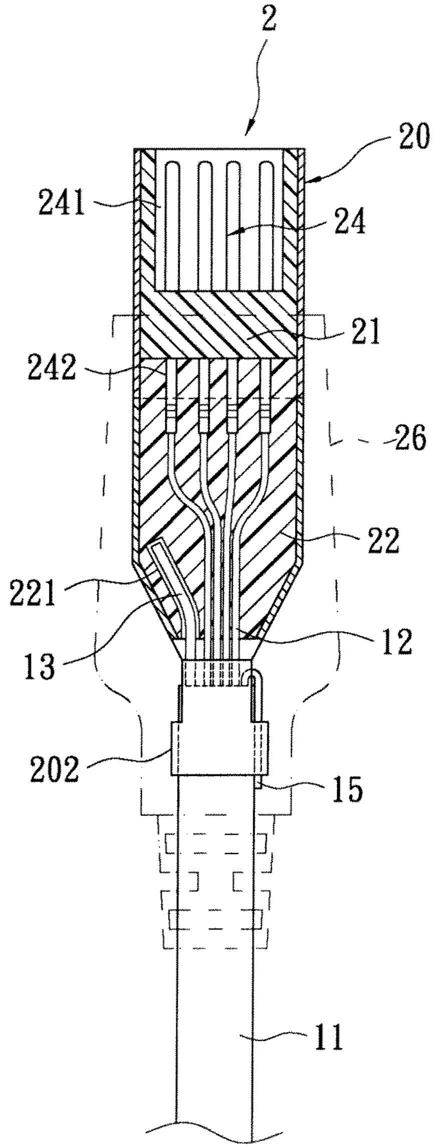
FIG. 6A is a cross-sectional view of the electrical connector according to the instant disclosure.

Please refer to FIG. 6A, which is a cross-sectional view of the electrical connector according to the instant disclosure. The electrical connector 2 has a metallic housing 20, a insulated body 21 formed in the metallic housing 20 and a plurality of terminals 24 received in the metallic body 21. Each terminal 24 has a front end 241 for electrical connecting with another electrical device, and a rear end 242 which are connected with the conductive wires 12. The electrical connector 2 further includes an insulating retainer 22 for retaining the conductive wires 12. The insulating retainer 22 is made of plastic or hot-melt rubber by injecting technology, which is partially enclosed a rear end of the terminals 24 and the conducting wires 12. The insulating retainer 22 is formed with a receiving slot 221 therein beside the conducting wires 12, and one end of the bendable shaped wire 13 is retractably disposed in the receiving slot 221. Therefore, the end of the bendable shaped wire 13 would not injure the conducting wire 12, for example, would not scrap and broke the insulated material layer of the conducting wire 12. The metallic housing 20 has a fixing tail 202 formed at one end thereof, which is clipped around the insulated packaging layer 11. The mesh grid 15 is arranged to contact with the fixing tail 202.

Please refer to FIG. 6B, which is a cross-sectional view of the electrical connector of another embodiment according to the instant disclosure. The insulating retainer 22 is usually formed by injected technology, and it will produce a large force during the plastic injecting process. To arrange the bendable shaped wire 13 in a proper position, a separating piece 28 is provided between the bendable shaped wire 13 and the conductive wires 12. The separating piece 28 is used to separate the bendable shaped wire 13 individually away the conductive wires 12, which could be a tape, a flexible plastic piece, wire, or a plastic tab . . . etc. Therefor, the separating piece 28 could keep the conductive wires 12 away from the bendable shaped wire 13 during plastic-injecting process. In other word, the conductive wires 12 would not be disorder and mixed with the bendable shaped wire 13.

Figure 7:
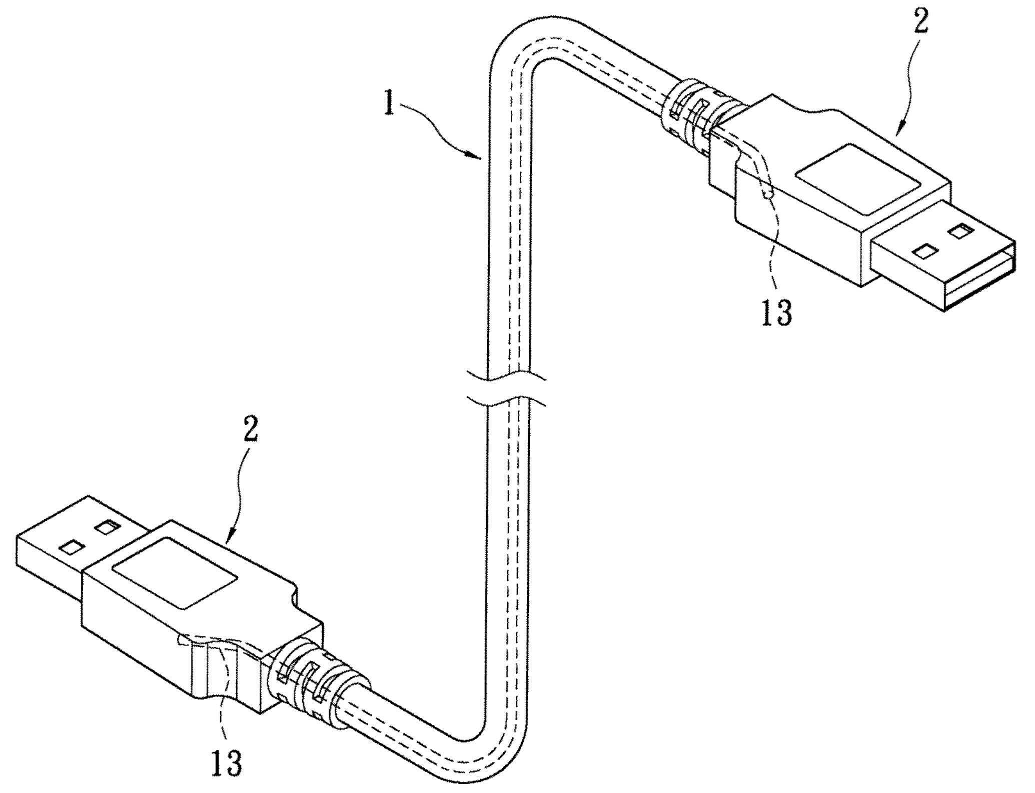
FIG. 7 is a perspective view showing the transmission wire is set with electrical connectors and erectly shaped according to the instant disclosure.
Figure 8:
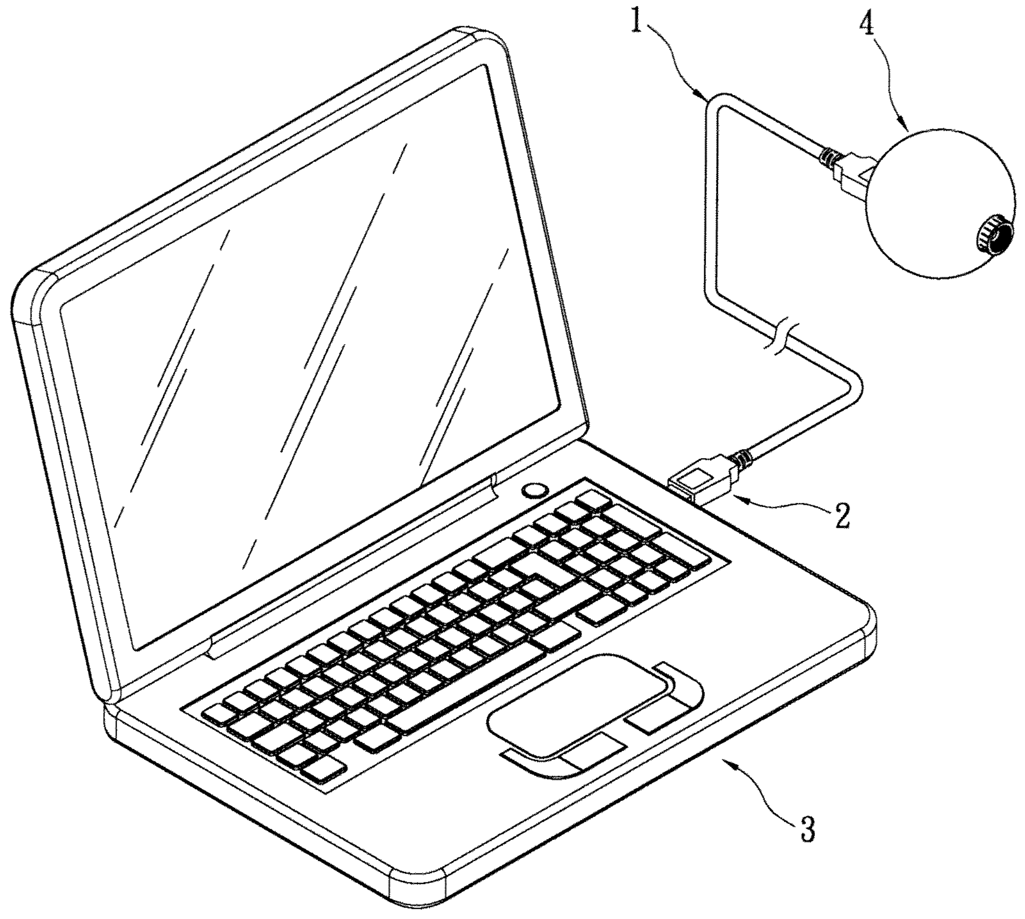
FIG. 8 is a perspective view showing the electrical connectors of the transmission wire connects with a first electronic device and erectly supports a second electronic device according to the instant disclosure.

Please refer to FIG. 7 and FIG. 8. The two ends of the bendable shaped wire 13 are partially extended into the two electrical connectors 2, so that the bendable shaped wire 13 could suspend the upper electrical connectors 2 at a higher position relative to the another electrical connector 2. As shown in FIG. 8, the two electrical connectors 2 electronically connect with the first electronic device 3 and the second electronic device 4 respectively, wherein the first electronic device 3 is a notebook computer, and the second electronic device 4 is a webcam. The first electronic device 3 and the second electronic device 4 are respectively set with a socket correspondly to the electrical connectors 2. The transmission wire 1 can be bent by 90 degree to be shaped and erectly supports the second electronic device 4 (webcam). Thus, the second electronic device 4 is fixed on a most appropriate position to accurately receive the aimed image, and thereby transmitting the image. Furthermore, the transmission wire 1 of the instant disclosure can erectly support some objects with the weight of 250 grams or less stably. The electrical connectors 2 can be electronically connected with microphones or other electronic devices needing to be fixed except the aforementioned webcam.

Figure 9:
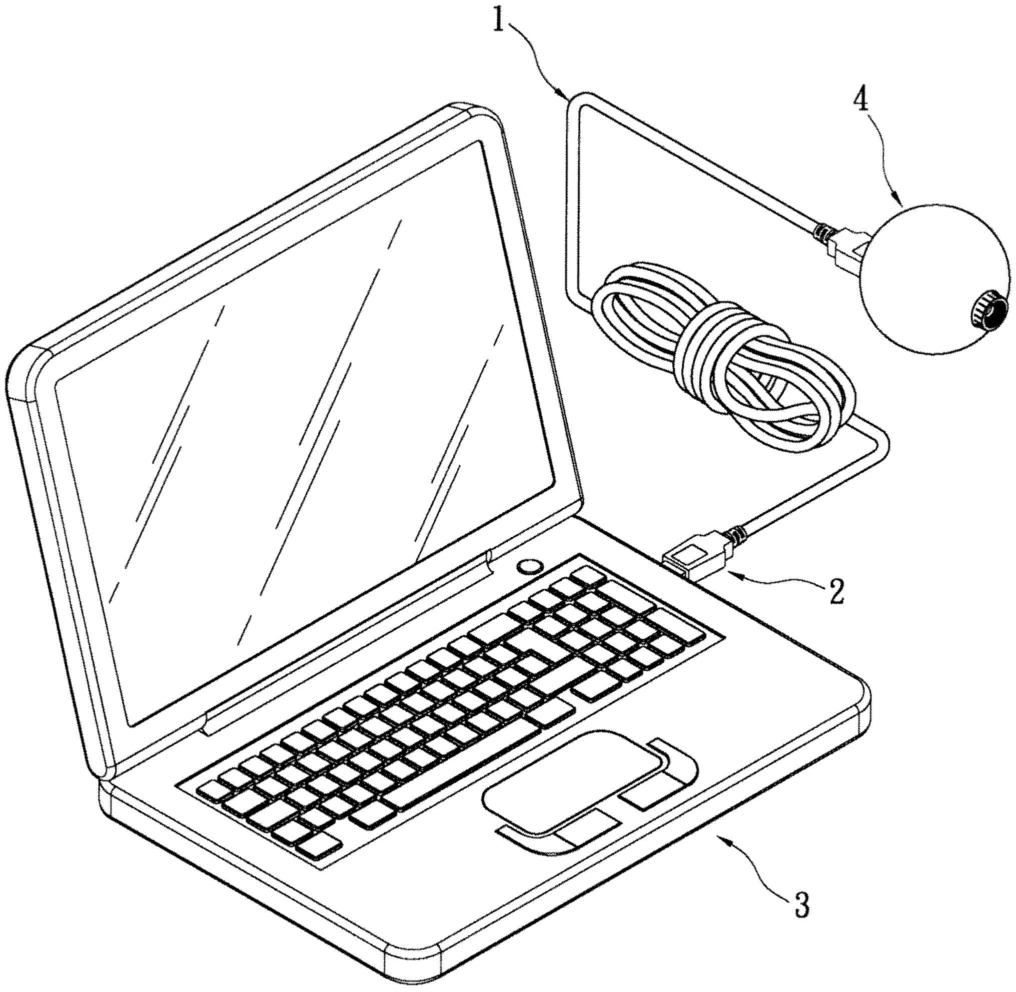
FIG. 9 is a perspective view showing the transmission wire bundles and erectly supports the second electronic device according to the instant disclosure.

Please refer to FIG. 9, the transmission wire 1 bundles and erectly supports the second electronic device 4 simultaneously, and thereby avoiding the transmission wire 1 messy and tangled to effect the practicability.

Figure 10:
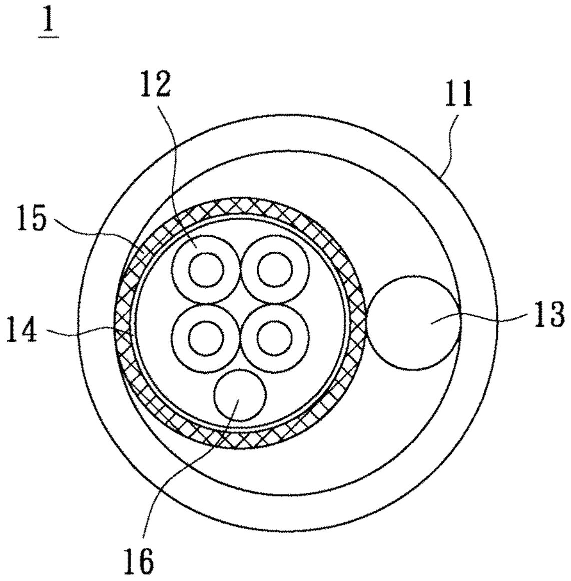
FIG. 10, which is a cross-sectional view of the transmission wire with a dummy wire according to the instant disclosure.

Please refer to FIG. 10, which is a cross-sectional view of the transmission wire with a dummy wire according to the instant disclosure. In this embodiment, a dummy line 16 is arranged beside the conductive wires 12 for grounding.

The efficacy and the characteristics of the instant disclosure are:

The transmission wire 1 can be arbitrarily bent and fixed on a desired position via setting the bendable shaped wire 13 inside the insulated packaging layer 11. Hence, the electronic devices such as microphones or webcams can be stably supported to be used at the most appropriate angle or height, so, the practicability is increased.

Further, because the transmission wire 1 of the instant disclosure can be bent and fixed, so, it is convenient to put the transmission wire 1 in order, and the situation of the transmission wire 1 is messy and tangled around the PC can be avoided.

While the instant disclosure has been described in terms of what is presently considered to be the most practical and preferred embodiments, it is to be understood that the instant disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A transmission wire, comprising:

a plurality of conducting wires respectively having a conducted core and an insulated material layer covered the conducted core;

a separating layer surrounding and covering the conducting wires as a round signal-transmitting/grounding wire;

a mesh grid surrounding the separating layer;

a bendable shaped wire disposed adjacent the mesh grid and made of flexible metal material;

an insulated packaging layer surrounding and covering the plurality of conducting wires; and two electrical connector connected with two ends of the conducting wires, wherein each electrical connector has a plurality of terminals connected with the conducting wires respectively, and an insulating retainer partially enclosed a rear end of the terminals and the conducting wires, wherein the insulating retainer is formed with a receiving slot therein beside the conducting wires, and one end of the bendable shaped wire is retractably disposed in the receiving slot;

wherein the bendable shaped wire transmits no electrical signal, and is functioning to support and retain the transmission wire in shape after the transmission wire is bent by a user, thereby one end of the transmission wire supports and fixes one of the electronic devices at a predetermined position related to the other one of the electronic devices.

2. The transmission wire according to claim 1, wherein the separating layer is made of aluminum foil paper.

3. The transmission wire according to claim 1, wherein the bendable shaped wire and the conducting wires are set together inside the insulated packaging layer.

4. The transmission wire according to claim 1, wherein the bendable shaped wire is set between the separating layer and the insulated packaging layer.

5. The transmission wire according to claim 1, wherein the bendable shaped wire is iron wire.

6. The transmission wire according to claim 5, wherein the diameter of the bendable shaped wire is from 0.6 mm to 2.0 mm.

7. The transmission wire according to claim 1, wherein the bendable shaped wire is copper wire.

8. The transmission wire according to claim 7, wherein the diameter of the bendable shaped wire is from 0.6 mm to 2.0 mm.

9. The transmission wire according to claim 1, wherein the external diameter of the insulated packaging layer is 3.0 mm to 9.0 mm.

10. The transmission wire according to claim 9, wherein the insulated packaging layer is made by an integral forming process of Polyvinylchloride (PVC).

11. The transmission wire according to claim 10, wherein the electrical connectors are USB (UNIVERSAL SERIAL BUS).

* * * * *